(12) United States Patent
Salmon

(10) Patent No.: US 8,639,263 B2
(45) Date of Patent: Jan. 28, 2014

(54) METHOD AND SYSTEM FOR PROVIDING LOCATION-BASED INFORMATION TO A GROUP OF MOBILE USER AGENTS

(75) Inventor: Michael Donald Salmon, Berkeley, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 366 days.

(21) Appl. No.: 12/338,655

(22) Filed: Dec. 18, 2008

(65) Prior Publication Data
US 2010/0159943 A1 Jun. 24, 2010

(51) Int. Cl.
*H04W 24/00* (2009.01)

(52) U.S. Cl.
USPC ............... 455/456.1; 455/456.6; 340/539.11

(58) Field of Classification Search
USPC ......... 455/456.1, 456.6; 340/539.11; 3/456.1, 3/456.6

See application file for complete search history.

(56) References Cited

U.S. PATENT DOCUMENTS

| | | | | |
|---|---|---|---|---|
| 6,091,959 | A * | 7/2000 | Souissi et al. | 340/7.46 |
| 7,023,995 | B2 * | 4/2006 | Olsson | 380/258 |
| 7,787,887 | B2 * | 8/2010 | Gupta et al. | 455/456.1 |
| 2007/0201376 | A1 * | 8/2007 | Marshall-Wilson | 370/252 |
| 2010/0056183 | A1 * | 3/2010 | Oh | 455/456.3 |
| 2011/0183686 | A1 * | 7/2011 | Quinn | 455/456.1 |

OTHER PUBLICATIONS

Bi, et al., "Broadcast-Multicast in 1x EV-DO Revision A Systems and its Application to Enhanced Mobile Services", Bell Labs Technical Journal, 11(4), p. 237-252 (2007).

* cited by examiner

*Primary Examiner* — Amancio Gonzalez

(57) ABSTRACT

A method and system for providing location-based information to a group of mobile user agents. A group of mobile user agents may be identified based at least in part on agent information for each of the mobile user agents in the group. The location information may indicate a location for the mobile user agents, which may be determined using GPS information or GPS assistance information. Location-based information may be determined for the group and provided to the group by broadcasting or multicasting. The mobile user agents may be configured to receive and process the location-based information. The location-based information may comprise GPS assistance information.

25 Claims, 6 Drawing Sheets

METHOD AND SYSTEM FOR PROVIDING LOCATION-BASED INFORMATION TO A GROUP OF MOBILE USER AGENTS

BACKGROUND INFORMATION

Significant overhead may be associated with a mobile user agent requesting data from the user's service provider. For example, a mobile user agent with a GPS receiver may periodically request GPS assistance information from an assistance server to more accurately determine the user's location. Creating and issuing a request, if applicable, and receiving and processing such information may be time-consuming for the mobile user agent, particularly at startup of each navigation session and where the same information is requested multiple times. GPS assistance may also require the mobile user agent to make a data call with each request, which may cause the user to incur additional service fees. Also, network traffic may become congested when multiple users in the same geographic area request GPS assistance around the same time. Other types of location-based information, such as local maps and advertisements, may be requested and received by mobile user agents as well. In some cases, such request and response cycles may contain repeated steps that, when the same information is transmitted to many users individually rather than by broadcasting or multicasting, may cause the burden on the various parties to the communication, such as the mobile user agent, the service provider, and the network, to be higher than necessary.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

A system and method may include various exemplary embodiments for providing location-based information to a group of mobile user agents. The system and method may identify a group of mobile user agents among a plurality of mobile user agents based at least in part on agent information for each of the mobile user agents in the group. Also, the system and method may determine location-based information for the group and/or provide the location-based information to the group in an optimized manner, such as by broadcasting or multicasting. The location-based information may be, in various exemplary embodiments, GPS assistance information. GPS assistance information may allow a mobile user agent to more accurately determine its geographic position when GPS satellite signals are unavailable or inadequate, such as indoors or in urban areas. A mobile user agent may also receive other information that assists the mobile user agent in determining its position.

The description below describes identification modules, determination modules, communication modules, confirmation modules, mobile user agents, service portals, service providers, assistance providers, and networks that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but is not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made.

Figure 1:
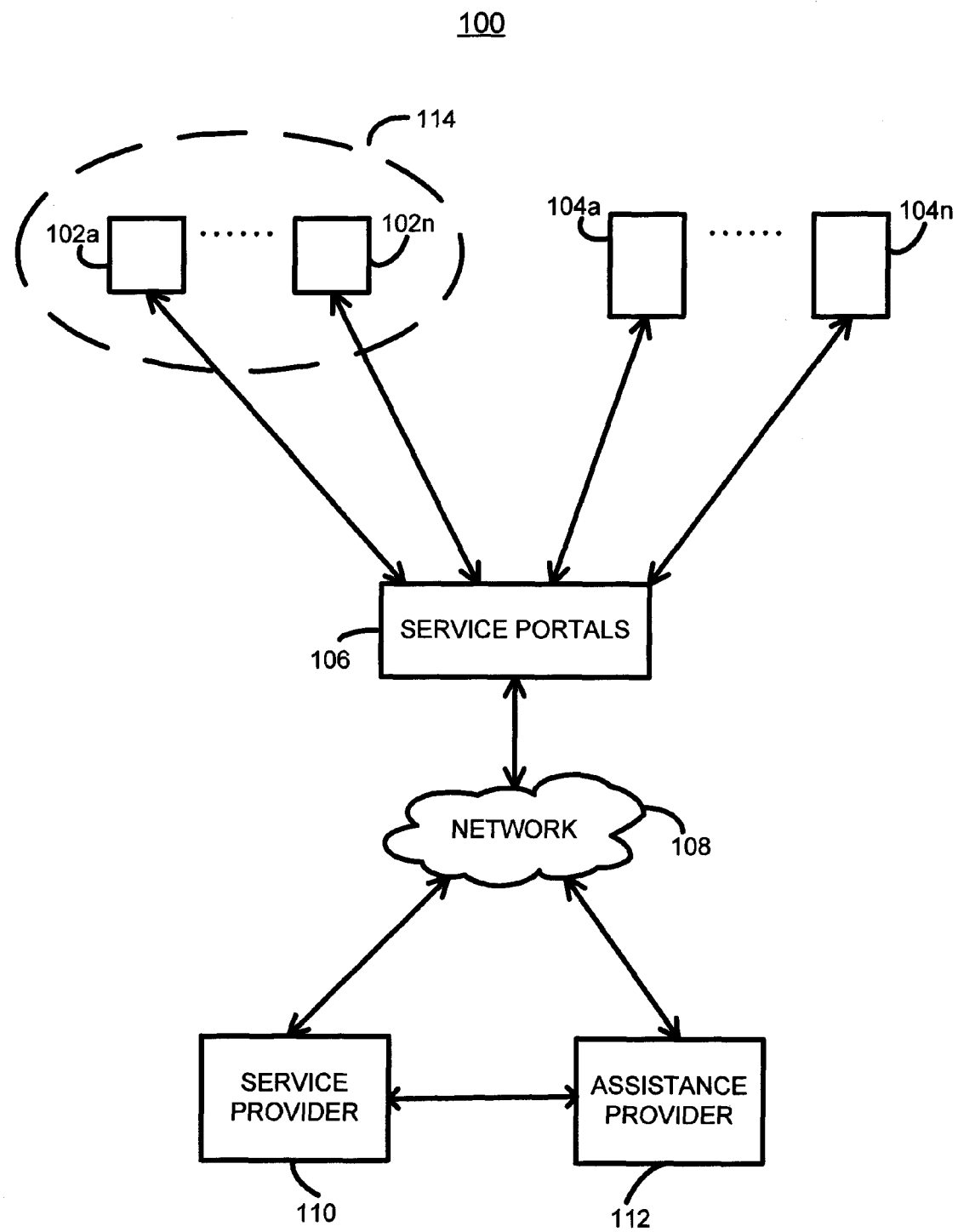
FIG. 1 depicts a block diagram of a system for providing location-based information to a group of mobile user agents, in accordance with an exemplary embodiment.

FIG. 1 illustrates a system for providing location-based information to a group of mobile user agents in accordance with various exemplary embodiments. A system 100 may include one or more mobile user agents 102*a-n*, one or more mobile user agents 104*a-n*, service portals 106, a network 108, a service provider 110, and/or an assistance provider 112. Although elements of the system 100 may be described as a single device, it will be appreciated that multiple instances of these devices may be included in the system 100, such as, for example, multiple service providers, multiple assistance providers, and multiple networks. A user may be associated with each mobile user agent 102 and/or mobile user agent 104 of the system 100. The mobile user agents 102*a-n* may comprise a group 114. The service portals 106 may be located at disparate locations and/or communicatively coupled to the service provider 110 and/or the assistance provider 112 via the network 108. The mobile user agents 102*a-n* and/or the mobile user agents 104*a-n* may each be communicatively coupled to the service provider 110 and/or the assistance provider 112 via the service portals 106 located at disparate locations.

The mobile user agent 102 and the mobile user agent 104 may be, for example, but not limited to, a cellular telephone, Session Initiation Protocol (SIP) phone, software client/phone, a desktop computer, a laptop/notebook, a server or server-like system, a module, a telephone, or a communication device, such as a personal digital assistant (PDA), a mobile phone, a smart phone, a remote controller, a personal computer (PC), a workstation, a mobile device, a phone, a handheld PC, a thin system, a fat system, a network appliance, and/or other mobile communication device that may be capable of transmitting and/or receiving data. Also, the mobile user agent 102 and/or the mobile user agent 104 may include one or more transceivers to transmit and/or receive one or more signals to and/or from the service provider 110 and/or the assistance provider 112. The mobile user agents 102a-n may each include a configuration module and a communication module, as described herein in reference to FIG. 4.

The service portals 106 may be, for example, but not limited to, a cellular telephone network signal tower, an Internet service provider router, a telephone adapter, a telephone router, an Ethernet router, a satellite router, a fiber optic router, a co-axial cable router, an Internet router, and/or other routing device that may provide and/or determine a transmission path for data to travel. Further, the service portals 106 may include a computer, software, and/or hardware to facilitate a routing and/or forwarding function of a signal.

The network 108 may be a wireless network, a wired network, or any combination of wireless, wired, and/or other network capable of communicating electronic data from one point to another. For example, the network 108 may include, without limitation, wireless LAN (WLAN), Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or other wireless network. In addition, network 106 may include, without limitation, telephone line, fiber optics, IEEE Ethernet 802.3, long-range wireless radio, wide area network (WAN) such as WiMax, infrared, Bluetooth™, and/or other similar applications, local area network (LAN), or global network such as the Internet. Also, the network 108 may enable a wireless communication network, a cellular network, an Intranet, or the like, or any combination thereof. The network 108 may further include one or any number of the exemplary types of networks mentioned above operating as a stand-alone network or in cooperation with each other.

The service provider 110 may include one or more service providers for providing voice and/or data service over, for example, an Internet Protocol (IP) network and/or a public switch telephone network (PSTN). For example, the service provider 110 may carry telephony signals (e.g., digital audio) encapsulated in a data packet stream over the Internet Protocol (IP) network. The service provider 110 may provide direct inward dialing (DID) Voice over Internet Protocol (VoIP) services, SIP services, and/or access a service. For example, the service provider 110 may include one or more computer systems and/or processors to provide services for the mobile user agents 102a-n and/or the mobile user agents 104a-n. The service provider 112 may include an identification module, a determination module, and a communication module, as described herein in reference to FIG. 3.

The assistance provider 112 may include one or more assistance providers for communicating data to assist the mobile user agents 102a-n and/or the mobile user agents 104a-n in determining their geographic locations. For example, the assistance provider 112 may include one or more computer systems and/or processors to provide assistance to the mobile user agents 102a-n and/or the mobile user agents 104a-n. The assistance provider 112 may communicate with the mobile user agents 102a-n, the mobile user agents 104a-n, and/or the service provider 110 in any way, such as over an IP network.

The mobile user agent 102 and/or the mobile user agent 104 may communicate with any component or entity depicted in FIG. 1 in any manner, including directly or via one or more networks, such as the network 108. For example, the mobile user agent 102 may connect first to the network 108 and then to one or more service portals (not shown) to reach the service provider 110 and/or the assistance provider 112. The mobile user agent 102 may also communicate with the service provider 110 and/or the assistance provider 112 via a WLAN bypassing a cell tower, for example.

Figure 2:
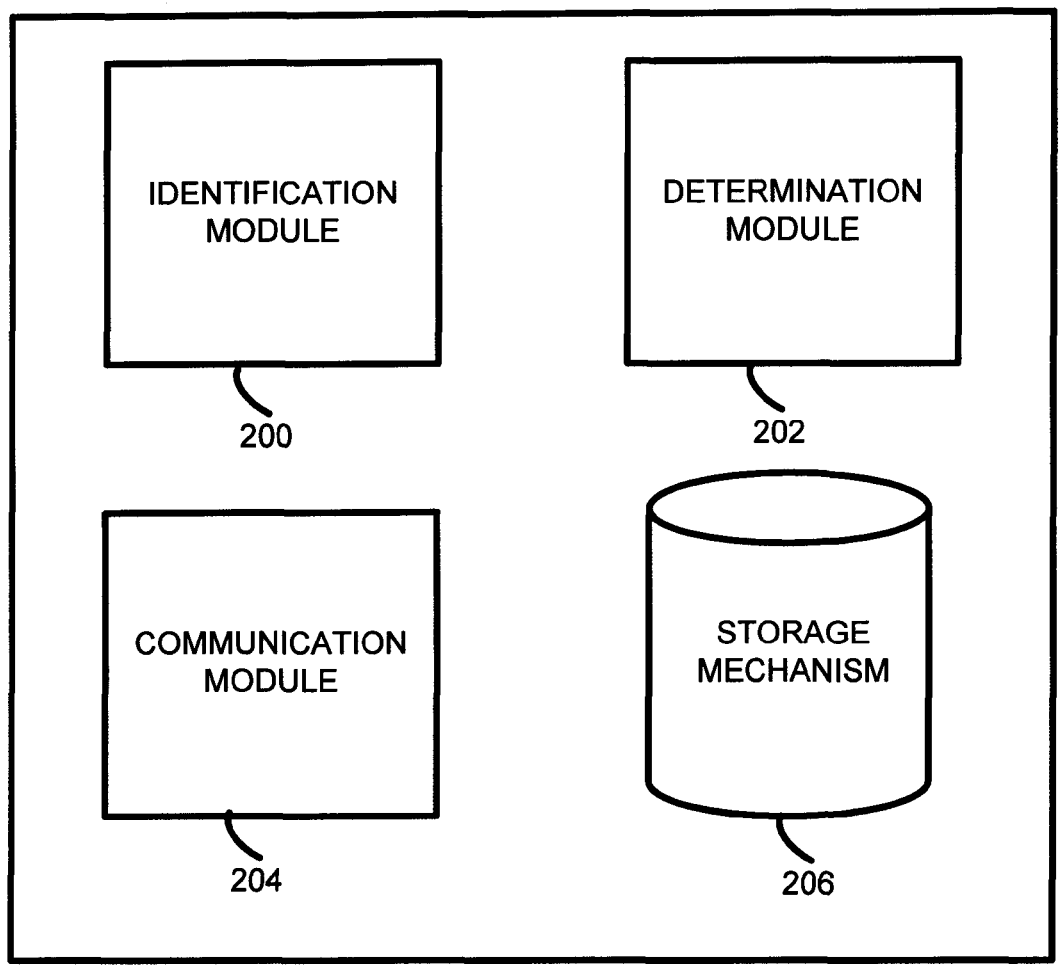
FIG. 2 depicts a block diagram of modules for providing location-based information to a group of mobile user agents, in accordance with an exemplary embodiment.

FIG. 2 illustrates a detailed block diagram of a service provider, in accordance with various exemplary embodiments. For example, the service provider 110 may include an identification module 200, a determination module 202, and a communication module 204. It is noted that the modules 200, 202, and 204 are exemplary and the functions performed by one or more of the modules may be combined with that performed by other modules. The functions described herein as being performed by the modules 200, 202, and 204 may also be separated and may be performed by other modules at devices local or remote to the service provider 110. The modules may each be a computer program or an appropriately programmed computer, such as a mainframe or personal computer, or may include a plurality of such computers cooperating to perform the functionality described herein. The modules may also communicate with a storage mechanism 206. The modules 200, 202, and 204 may also be coupled to or integrated with the service provider 110. For example, the modules 200, 202, and 204 may be external devices that are wirelessly coupled and/or communicatively coupled to the service provider 110 via an interface port which may include, without limitation, USB ports, system bus ports, or Firewire ports and other interface ports. Further, computer code may be installed on the service provider 110 to control and/or operate a function of the identification module 200, the determination module 202, and/or the communication module 204.

In various exemplary embodiments, the identification module 200 of the service provider 110 may identify the group 114 of mobile user agents 102a-n to receive location-based information. For example, the identification module 200 may dynamically identify the mobile user agents 102a-n by identifying a group location and/or geographic area (e.g., the San Francisco Bay Area) and determining that they are all located in the same or similar group location and/or geographic area, as compared to other mobile user agents 104a-n that may be located in different locations or geographic areas. To determine the location of a particular mobile user agent 102 (and therefore whether it is within or outside of a group location and/or geographic area), the service provider 110 may receive location information for the mobile user agent 102, which may indicate a current location of the mobile user agent 102, as described herein. The location of each mobile user agent 102 may be determined or estimated in various ways and at any level of accuracy and granularity, such as within just a few meters, to within a cell, to within a citywide area, to within a state or country, for example.

Various network-based location mechanisms may be used to estimate the location of a mobile user agent 102. For example, a mobile phone's general location may be estimated based on its system ID (SID) and network ID (NID) and/or by determining the cell ID of the cell currently servicing the mobile phone. Other information and/or location techniques may be used either alone or in combination as well, including Angle of Arrival (AOA), Time of Arrival (TOA), Time Difference of Arrival (TDOA), Timing Advance (TA), Advanced Forward Link Trilateration (AFLT), Enhanced Forward Link Trilateration (EFLT), and/or Enhanced Observed Time Difference (EOTD). The location of a mobile user agent 102 may also be determined using various local-range mechanisms, such as Bluetooth™, WLAN, infrared, ultrasound, artificial vision, or RF wireless communications.

Various mobile user agent-based location mechanisms may also be used to determine the location of a mobile user agent 102. One example may be the global positioning system (GPS), which allows devices, such as various types of mobile user agents that include a GPS receiver, to determine their current geographic position.

Because GPS may require a line of sight to a plurality of GPS satellites, however, it may be unavailable at various locations, such as indoors or in urban areas. Assisted GPS may be used in such circumstances. Assisted GPS may involve a mobile user agent 102 receiving network information (in addition to GPS satellite signals) to determine its position. For example, a mobile user agent 102 may determine that it is not receiving the sufficient number of GPS signals, or that the GPS signals it is receiving are weak, and request GPS assistance information from the service provider 110 and/or the assistance provider 112 (via a location proxy server, for example). The assistance provider 112 (e.g., an assistance server), which may be included in or communicatively coupled to the service provider 110, may respond by providing GPS assistance information to a mobile user agent 102 over a data connection to assist the mobile user agent 102 with GPS satellite acquisition or otherwise determine its location. For example, a mobile user agent 102 may send the portions of the GPS signals it received to the assistance provider 112, which may be more powerful than the mobile user agent 102 and may be able to piece together the signals to determine the location of the mobile user agent 102. The assistance provider 112 may then provide that information to the mobile user agent 102 over one or more networks, such as the Internet, for example. Also, the assistance provider 112 may locate the mobile user agent 102 through any of the network-based location mechanisms described herein. As described herein, GPS or Assisted GPS may be used alone or in combination with any other location mechanism for determining the location of a mobile user agent 102.

Various other location mechanisms may also be used to determine the location of a mobile user agent 102 and/or a group 114 of mobile user agents 102*a-n*. For example, the location of a mobile user agent 102 may be estimated based on the prior registration of the mobile user agent 102 and/or its associated user with the service provider 110. Registration may involve the mobile user agent 102 providing a geographic identifier for the associated user (e.g., the user's street address, city, state, or zip code) or personal information for the user (e.g., the user's gender or age). A likely location for the user may be determined based on such information. A likely location for a particular mobile user agent 102 may also be determined based on the user's past use of the mobile user agent 102 at a particular location. Further, a group 114 of mobile user agents 102*a-n* may be identified based on the proximity of one or more of the mobile user agents 102*a-n* to each other (e.g., within 100 feet, within 500 yards, within the same cell, within the same city). A group 114 of mobile user agents 102*a-n* may also be identified based on the locations of one or more of the mobile user agents 102*a-n* within a particular group location and/or geographic area.

A group 114 of mobile user agents 102*a-n* may be identified based on any other criteria as well, such as device capability. For example, as described herein, a group 114 of mobile user agents 102*a-n* may be registered with the service provider 110 to receive certain location-based information and/or configured to receive such information. The mobile user agents 102*a-n* may also be configured to receive broadcast or multicast signals. A group 114 of mobile user agents 102*a-n* may also be identified based on agent information indicating their device and/or network capabilities. For example, there may exist 1000 mobile devices in a cell site, but only nine are devices capable of receiving a broadcast advertisement. A group 114 may not be identified, and the advertisement may not be provided, in those circumstances. If, however, 900 of the mobile devices were capable of receiving the broadcast advertisement, the group 114 may be identified and the advertisement may be provided to those devices. A threshold (e.g., 900 mobile devices) may determined to identify the group 114. Also, a group 114 of subgroups (not shown) may be identified. For example, a group 114 of mobile user agents 102*a-n* within an entire state may be identified as including various cells or sectors, which may also be identified as groups themselves.

It is noted that a group 114 of mobile user agents 102*a-n* may be identified at any time and/or based on any criteria. Identification may also be in response to any event and/or to any information that may be received. For example, identification of a group 114 may be triggered by a certain number of the mobile user agents 102*a-n* being within a certain area at once or by a certain number of the mobile user agents 102*a-n* submitting various requests over time (e.g., whenever at least ten mobile user agents in a particular cell submit a GPS assistance request).

As depicted in FIG. 1 and FIG. 2, determination module 202 of service provider 110 may determine location-based information to be provided to the group 114. As referred to herein, location-based information may include any type of information, including, for example, enhanced location-based services (LBS) offered to a user when his or her service provider or mobile user agent is aware of the user's location. For example and without limitation, location-based information may include a map of the mobile user agent's current location at a particular zoom level, turn-by-turn directions to a desired location, information regarding a nearby point of interest for the user, traffic alerts, the address of a nearby restaurant, the location of the closest automated teller machine (ATM), or the location and current status of another mobile user agent (e.g., a friend of the user). Location-based information may also include advertising information. For example, the information may include an image of a nearby retail store's logo and information about a current promotion it is having, or a coupon for a nearby grocery store. Location-based information may also include GPS assistance information. Location-based information may also be associated with or specifically tailored to the group 114. Location-based information may also be associated with or specifically tailored to a group location and/or geographic area corresponding to the group 114. Determination module 202 may retrieve location-based information from the storage mechanism 206, which may store the location-based information as electronic information, files, and/or documents in any way, including, for example, a hierarchical database, relational database, or any other storage mechanism, for any length of time. The storage mechanism 206 may be included in the service provider 110 or may be communicatively coupled to the service provider 110 via one or more networks local or remote to the service provider 110. Further, the storage mechanism 206 may be implemented across multiple devices and/or other components local or remote to one another. The determination module 202 may also receive location-based information from a location-based information provider (not shown), such as a common location-based services platform, via one or more networks. It is also noted that the location-based information determined for one group 114 may be different from another group (not shown). Further, the service provider 110 may identify one or more sub-groups within a group based on, for example, any of the criteria described herein. The location-based information determined for each sub-group may be tailored to that respective sub-group (e.g., location-based information for the east side of a city and location-based information for the west side of a city).

As depicted in FIG. 1 and FIG. 2, the communication module 204 of the service provider 110 may provide location-based information to the group 114. The information may be provided at any time (e.g., at startup or shutdown for a mobile user agent 102, at periodic intervals, or as determined by the service provider 110). The information may be unicast to each particular mobile user agent 102 in the group 114, or it may be broadcast or multicast to the group 114. In various exemplary embodiments, the group 114 of mobile user agents 102a-n may be identified as a broadcast/multicast group for receiving location-based information via broadcasting and/or multicasting. Broadcasting and multicasting may refer to various point-to-multipoint communication methods that allow the same information to be transmitted from a single source to multiple destinations at once. Broadcasting, for example, may provide information to all mobile user agents in a network, whereas multicasting may provide information to only a defined group of mobile user agents in a network (e.g., only the mobile user agents which have joined the group). Examples of broadcasting and multicasting mechanisms include Evolution-Data Optimized (EV-DO) Broadcast and Multicast Service (BCMCS) and/or Enhanced Broadcast and Multicast Service (EBCMCS) in CDMA2000 mobile networks. The communication module 204 may proactively broadcast or multicast location-based information to the group 114 (e.g., without first receiving a user request for the location-based information).

The mobile user agents 102a-n may be specifically configured to receive and/or process location-based information. For example, a mobile user agent 102 may include hardware and/or software configured to receive data via a TCP/IP listen socket or to communicate with the service provider 110 and/or the assistance provider 112 via other protocols (e.g., HTTP, SIP, SMS). A mobile user agent 102 may also include hardware and/or software configured to decode and/or process the received location-based information by, for example, displaying a map or advertisement on the screen of a mobile phone. Various applications stored on a mobile user agent 102 may also make use of the location-based information, such as by displaying interactive directions on the screen of a mobile phone. Also, group and/or security key information may be tailored to ensure that only the mobile user agents 102a-n in the group 114 may be capable of decoding the location-based information.

In one embodiment, and without limitation, the service provider 110 may monitor all mobile user agents in a particular network (e.g., the mobile user agents 102a-n and the mobile user agents 104a-n) and dynamically determine that a particular group 114 of mobile user agents 102a-n within, for example, the same cell, sector, and/or network submitted a request for GPS assistance. As is well known, in various situations GPS assistance may require lengthy communications between a mobile user agent and service provider, and/or may require that the mobile user agent generate a data call each time it requests GPS assistance information. In that way, a user operating a mobile user agent may incur fees for utilizing GPS assistance. Further, when a group of mobile user agents are within the same or similar geographic areas (e.g., the same cell) and submit a request at about the same time, the GPS assistance information provided to each mobile user agent may be substantially similar, if not identical. The service provider 110 may therefore recognize that a certain number of mobile user agents are near each other, proactively broadcast or multicast GPS assistance information to the entire group, and thereby avoid overhead associated with traditional point-to-point GPS assistance. The mobile user agents 102a-n may then store the GPS assistance information for future use, which may substantially decrease the time it takes to begin a navigation session with one or more of the mobile user agents 102a-n in the future. Broadcasting or multicasting information may also conserve valuable network resources.

In another embodiment, and without limitation, the service provider 110 may recognize that a number of the mobile user agents (e.g., the mobile user agents 102a-n) subscribed to a location-based service are within a particular geographic area (e.g., the San Francisco Bay Area). The service provider 110 may then dynamically identify a group 114 of mobile user agents 102a-n and a group location and/or geographic area for the mobile user agents 102a-n (e.g., their common cell site, the average coordinate of all users in the group, a popular location such as downtown San Francisco, or the location of a random user in the group), which may be estimated and may be within the particular geographic area, for example. The service provider 110 may determine location-based information for the entire group, such as an identical local map (overlaying each user's location), points of interest in the San Francisco Bay Area, advertisements for nearby retail stores, or a mobile television broadcast. The service provider 110 may also preprocess the location-based information before it is sent. For example, the service provider 110 may modify the location-based information to be a "best fit" map for the group location or create advertisements for retail stores that are closest to the most mobile user agents in the group. The service provider 110 may then proactively broadcast or multicast the information to the group 114 rather than providing the information to each mobile user agent 102 individually. Time, overhead, and network bandwidth may thereby be conserved. For example, once received, a local map may be cached on the mobile user agent 102 and displayed quickly whenever the user later selects a "View Local Map" option. The user may also avoid making multiple data calls for the same information (e.g., to view the same local map). The cached version of the local map may be used until, for example, the mobile user agent 102 changes its location, in which case the mobile user agent 102 may request and/or receive a new local map for the new location.

In various exemplary embodiments, other devices, entities, or components may include the modules of the service provider 110 and/or perform the functions of the service provider 110 as described herein. For example, the assistance provider 112 may identify a group 114 of mobile user agents 102a-n, determine location-based information for the group 114, and/or provide location-based information to one or more of the mobile user agents 102a-n in the group 114. Also, a location-based service provider (not shown) may provide location-based information to one or more of the mobile user agents 102a-n in the group 114.

Figure 3:
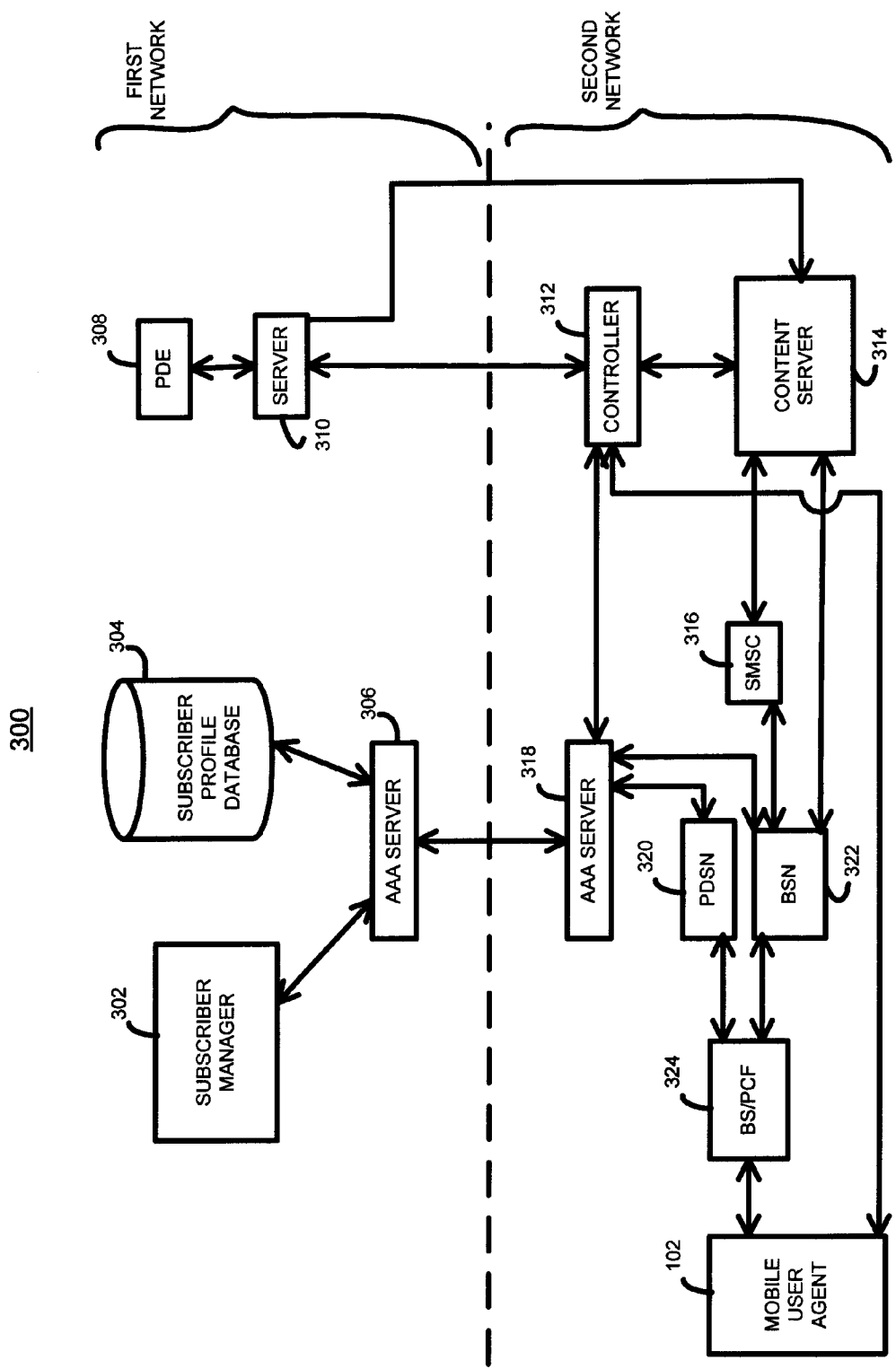
FIG. 3 depicts a block diagram of another system for providing location-based information to a group of mobile user agents, in accordance with an exemplary embodiment.

FIG. 3 illustrates another system for providing location-based information to a group of mobile user agents in accordance with various exemplary embodiments. A system 300 may include various components 302-310, which may be part of a first network, and various components 312-324 and 102, which may be part of a second network. The first network may include a broadcast/multicast subscriber profile manager 302, a subscriber profile database 304, an authentication, authorization, and accounting (AAA) server 306, a position determination entity (PDE) 308, and/or a server 310. The second network may include a broadcast/multicast controller 312, a broadcast/multicast content server 314, a short message service center (SMSC) 316, an AAA server 318, a packet data serving node (PDSN) 320, a broadcasting serving node (BSN) 322, a base station/packet control function (BS/PCF) 324, and/or a mobile user agent 102. Although elements of the system 300 may be described as a single device, it will be appreciated that multiple instances of these devices may be included in the system 300. The components of the first network and second network may be located at disparate locations and/or coupled via one or more networks. Also, the components may be included in or communicatively coupled to the service provider 110, the assistance provider 112, or any other device, entity, or component.

The mobile user agent 102 may subscribe to a broadcast/multicast service for receiving location-based information. The broadcast/multicast subscriber profile manager 302 may manage profile information for the mobile user agent 102 (e.g., when the mobile user agent 102 should and should not receive location-based information), which may be stored in the subscriber profile database 304. The position determination entity 308 may assist the mobile user agent 102 in acquiring its location, as described herein. The server 310 may be, for example, a location proxy server (LPS), a Secure User Plane Location (SUPL) server, and/or a Mobile Positioning Center (MPC) server. The server 310 may interface with the broadcast/multicast controller 312 via any application programming interface (API) communicated via an IP network. The API may be defined in advance to allow the server 310 and the broadcast/multicast controller 312 to communicate. An API call from the server 310 to the broadcast/multicast controller 312 may include, for example, a variable defining the group 114 of mobile user agents 102a-n to receive the location-based information, a variable informing downstream components (e.g., the mobile user agents 102a-n) how to handle the location-based information (e.g., routing information, security signatures), and a variable containing the raw data of the location-based information. Location-based information may be provided to the mobile user agent 102 via the broadcast/multicast content server 314, the short message service center 316 (e.g., if the location-based information is a text message), the broadcasting serving node 322, and/or the base station/packet control function 324. The packet data serving node 320 may act as the connection point between the radio access network (RAN) transmitting signals to and from the mobile user agent 102 and the IP network in FIG. 3. The broadcasting serving node 322 may operate at the same level as the packet data serving node 320 and/or may operate separately or as a hardware or software extension of another device, such as the packet data serving node 320.

Figure 4:
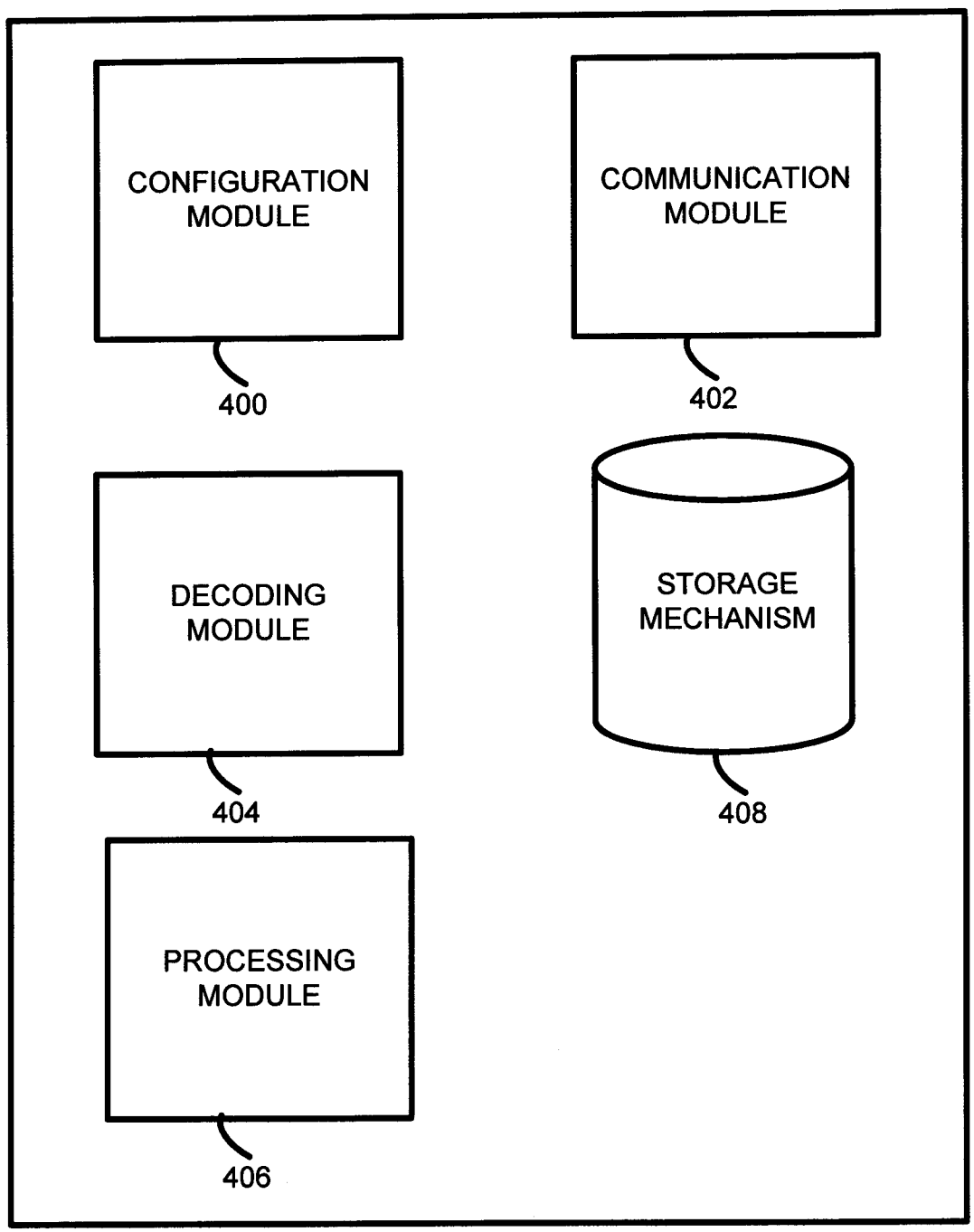
FIG. 4 depicts a block diagram of modules for receiving location-based information, in accordance with an exemplary embodiment.

FIG. 4 illustrates a detailed block diagram of a mobile user agent in accordance with various exemplary embodiments. For example, the mobile user agent 102 may include a configuration module 400, a communication module 402, a decoding module 404, and a processing module 406. It is noted that the modules 400, 402, 404, and 406 are exemplary and the functions performed by one or more of the modules may be combined with that performed by other modules. The functions described herein as being performed by the modules 400, 402, 404, and 406 may also be separated and may be performed by other modules at devices local or remote to the mobile user agent 102. The modules may each be a computer program or an appropriately programmed computer, such as a mainframe or personal computer, or may include a plurality of such computers cooperating to perform the functionality described herein. The modules may also communicate with a storage mechanism 408. The modules 400, 402, 404, and 406 may also be coupled to or integrated with the mobile user agent 102. For example, the modules may be external devices that are wirelessly coupled and/or communicatively coupled to the mobile user agent 102 via an interface port which may include, without limitation, USB ports, system bus ports, or Firewire ports and other interface ports. Further, computer code may be installed on the mobile user agent 102 to control and/or operate a function of the configuration module 400, the communication module 402, the decoding module 404, and/or the processing module 406. It is noted that the mobile user agent 104 may have any and/or all of the modules depicted in FIG. 4 as well.

In various exemplary embodiments, the configuration module 400 may receive configuration information to allow the mobile user agent 102 to receive location-based information in the future. For example, and without limitation, the service provider 110 (or another device or entity) may provide data to the mobile user agent 102. The data may be acted upon by the mobile user agent 102 to change the functionality of the mobile user agent 102 so that it recognizes location-based information in the future. The data may be stored permanently or temporarily in the storage mechanism 408, which may be any type of storage mechanism for storing electronic data in any way for any length of time, including, for example, a hard drive, ROM, RAM, or any other storage mechanism. The storage mechanism 408 may be included in the mobile user agent 102 or may be communicatively coupled to the mobile user agent 102 via one or more networks local or remote to the mobile user agent 102. Further, the storage mechanism 206 may be implemented across multiple devices and/or other components local or remote to one another. The communication module 402 may be capable of receiving location-based information provided by the service provider 110 (or another device or entity), as described herein. The decoding module 404 may be capable of decoding the location-based information, as described herein. The processing module 406 may be capable of processing the location-based information, as described herein, such as by displaying it on a screen of a mobile phone.

Figure 5:
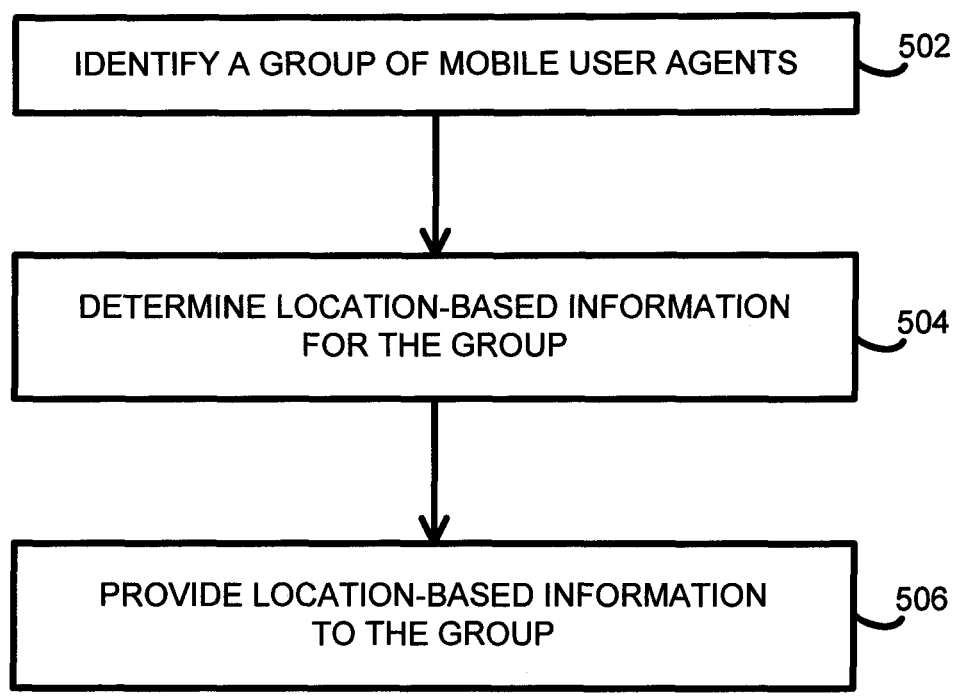
FIG. 5 depicts a flowchart of a method for providing location-based information to a group of mobile user agents, in accordance with an exemplary embodiment.

FIG. 5 illustrates a flowchart of a method for providing location-based information to a group of mobile user agents in accordance with various exemplary embodiments. This exemplary method is provided by way of example, as there are a variety of ways to carry out the methods disclosed herein. The method 500 shown in FIG. 5 can be executed or otherwise performed by one or a combination of various systems. The method 500 may be carried out through the system 100 of FIG. 1 and/or the system 200 of FIG. 2 by way of example, and various elements of FIG. 1 and FIG. 2 are referenced in explaining exemplary method 500 of FIG. 5. Each block shown in FIG. 5 represents one or more processes, methods, or subroutines carried out in the exemplary method 500. The method 500 may begin at block 502.

At block 502, a group 114 of mobile user agents 102a-n may be identified, as described herein. In an exemplary embodiment, the mobile user agents 102a-n may be identified among a plurality of mobile user agents associated with a network. The mobile user agents 102a-n in the group 114 may be identified based on location information for the mobile user agents 102a-n. For example, various network-based mechanisms (e.g., cell ID) or mobile user agent-based mechanisms (e.g., GPS, Assisted GPS) may be used to determine the location of each mobile user agent 102 and/or mobile user agent 104 in a network. A service provider may receive such information and determine what mobile user agents 102a-n, if any, are within a group 114 (e.g., within a certain cell or geographic area) and what mobile user agents 104a-n, if any, are outside of the group 114. A group 114 may be identified as a broadcast/multicast group for receiving location-based information broadcast or multicast to the group 114.

At block 504, the service provider 110 may determine location-based information for the identified group 114, as described herein. For example, the location-based information may be GPS assistance information appropriate for all of the mobile user agents 102a-n in the group 114 (e.g., GPS assistance specific to the San Francisco Bay Area) or advertisements targeted to the geographic area associated with the group 114. The service provider 110 may retrieve the location-based information from various location-based service providers (not shown).

At block 506, the service provider 110 may provide the location-based information to the identified group 114 of mobile user agents 102a-n, as described herein. For example, the service provider 110 may proactively broadcast or multicast location-based information, such as GPS assistance information, to a group 114 without waiting to receive a request for such information from the mobile user agents 102a-n in the group 114. In that way, the mobile user agents 102a-n may avoid making multiple data requests and may thereby save the users time and money and reduce congestion on the network. The mobile user agents 102a-n in the group 114 may be configured in advance (e.g., through hardware or software) so that they are capable of receiving and processing the location-based information. For example, a mobile user agent 102 may be configured to recognize enhanced location-based information transmitted using a specific communications protocol and process the information by displaying it to the user on a device screen. Location-based information may be provided to the group 114 at any time. For example, the service provider 110 may monitor the mobile user agents 102a-n and the mobile user agents 104a-n in a network and provide location-based information whenever a group 114 may be identified (e.g., whenever at least ten mobile user agents in a cell submit a GPS assistance request). A group may expire over time as well, in which case location-based information may no longer be provided (e.g., when a substantial portion of the mobile user agents in a cell left the cell or turned off their mobile phones). Further, the location-based information provided to a certain mobile user agent 102 may change over time (e.g., if the mobile user agent 102 switched cell areas).

Figure 6:
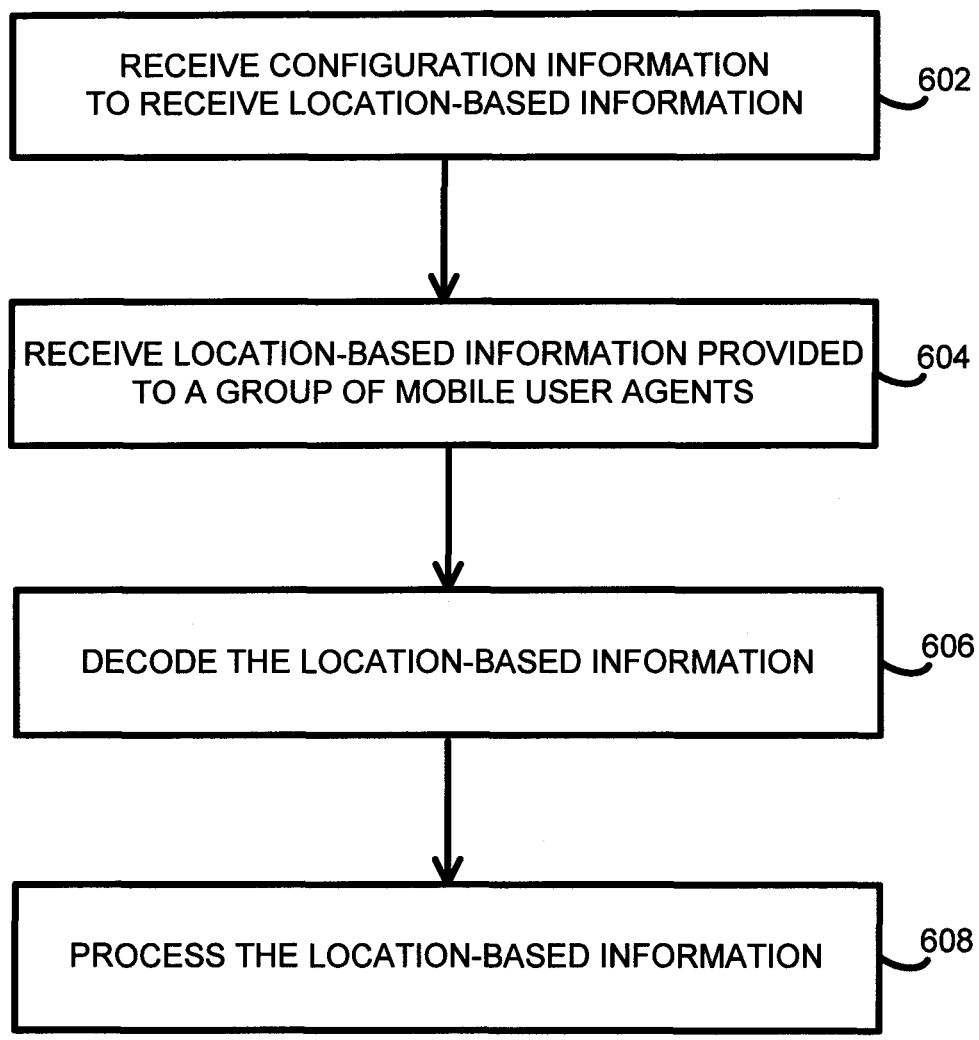
FIG. 6 depicts a flowchart of a method for receiving location-based information, in accordance with an exemplary embodiment.

FIG. 6 illustrates a flowchart of a method for receiving location-based information in accordance with various exemplary embodiments. This exemplary method is provided by way of example, as there are a variety of ways to carry out the methods disclosed herein. The method 600 shown in FIG. 6 can be executed or otherwise performed by one or a combination of various systems. The method 600 may be carried out through the system 100 of FIG. 1 and/or the system 200 of FIG. 2 by way of example, and various elements of FIG. 1 and FIG. 2 are referenced in explaining exemplary method 600 of FIG. 6. Each block shown in FIG. 6 represents one or more processes, methods, or subroutines carried in the exemplary method 600. The method 600 may begin at block 602.

At block 602, a mobile user agent 102 may receive and/or execute configuration information to allow it to receive location-based information in the future, as described herein. The configuration information may, for example, indicate to the mobile user agent 102 that it should authorize location-based information from a certain network source. The configuration information may also instruct the mobile user agent 102 how to decode and process location-based information received in the future. The configuration information may also instruct the mobile user agent 102 how to provide its location to, for example, the service provider 110 and/or the assistance provider 112, in the future. The configuration information may be received from any source, including, for example, the service provider 110 and/or the assistance provider 112.

At block 604, the mobile user agent 102 may receive location-based information provided to a group 114 of mobile user agents 102a-n, as described herein. The location-based information may be received from any source, including, for example, the service provider 110 and/or the assistance provider 112.

At block 606, the mobile user agent 102 may decode the location-based information according to the configuration information previously received.

At block 608, the mobile user agent 102 may process the location-based information. For example, the mobile user agent 102 may present a visual display on a device screen based on the location-based information (e.g., a local map with the user's location overlayed).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer-implemented method, comprising:
   determining, using one or more processors, location information of a plurality of mobile user agents associated with a network;
   using the one or more processors, identifying a group of mobile user agents among the plurality of mobile user agents based at least in part on the determined location information wherein identifying the group is triggered by a predetermined number of the plurality of mobile user agents being or taking action in a predetermined geographic area encompassing the determined location information;
   determining location-based information for the group;
   providing the location-based information to the group, each of the mobile user agents in the group being capable of receiving and processing the location-based information to determine a geographical location derived from the location-based information and display the location-based information in concert with a location of the particular mobile user agent, wherein the location-based information is at least one of map information, navigation information, traffic information, promotional information, point of interest information, advertisement information, and GPS assistance information.

2. The method of claim 1, wherein:
   the group is a broadcast/multicast group;
   the group is further identified based on agent information for each of the mobile user agents in the group, wherein the agent information indicates, at least in part, that the respective mobile user agent is capable of receiving and processing the location-based information; and
   providing the location-based information to the group comprises broadcasting or multicasting the location-based information to the group.

3. The method of claim 1, wherein:
   identifying the group further comprises:
      identifying a group location within a geographic area;
      determining a location for each of the plurality of mobile user agents associated with the network; and determining that the mobile user agents in the group are within the group location based at least in part on the location of each of the mobile user agents in the group; and the location-based information is associated with the group location.

4. The method of claim 1, wherein:

identifying the group comprises:

identifying the mobile agents in the group as being within a geographic area; and determining an estimated group location within the geographic area for the group, the estimated group location based at least in part on the agent information for each of the mobile user agents in the group; and the location-based information is associated with the estimated group location.

5. The method of claim 2, wherein the agent information for each of the mobile user agents in the group further comprises device or network capabilities of the respective mobile user agent.

6. The method of claim 1, wherein the location information for each of the mobile user agents in the group comprises the location of the respective mobile user agent determined by the respective mobile user agent using GPS information or GPS assistance information.

7. The method of claim 2, wherein the agent information indicates that at least one of the mobile user agents in the group previously requested GPS assistance information.

8. The method of claim 1, wherein the location-based information is provided without first receiving a user request for the location-based information from any of the mobile user agents in the group.

9. The method of claim 1, wherein determining location-based information for the group comprises requesting the location-based information from a location-based information provider.

10. A non-transitory computer readable medium comprising code to perform the steps of the methods of claim 1.

11. The method of claim 1, wherein the group is further identified based on device or network capabilities of each of the plurality of mobile user agents.

12. The method of claim 1, wherein identification of the group is triggered when a majority of the predetermined number of mobile user agents in the predetermined geographic area are capable of receiving and processing the location-based information.

13. The method of claim 1, wherein identification of the group is triggered when the predetermined number of mobile user agents take action by subscribing to a location based service in the predetermined geographic area.

14. The method of claim 1, further comprising:

identifying at least one sub-group of the group;

determining location-based information for the at least one sub-group; and providing the location-based information to the sub-group.

15. The method of claim 1, wherein the location based information is tailored to the group based on a geographic area corresponding to the determined location information.

16. The method of claim 1, wherein identification of the group is triggered in response to a set of the plurality of mobile user agents within the same cell, sector, or network within the predetermined geographic area taking action by submitting a request for GPS assistance.

17. A computer-based system, comprising:

an identification module configured to identify a group of mobile user agents among a plurality of mobile user agents associated with a network based at least in part on a determined location of the plurality of mobile user agents wherein identifying the group is triggered by a predetermined number of the plurality of mobile user agents being or taking action in a predetermined geographic area encompassing the determined location information;

a determination module comprising at least one computer processor configured to determine location-based information for the group; and a communication module configured to provide the location-based information to the group, each of the mobile user agents in the group being capable of receiving and processing the location-based information to determine a geographical location of the mobile user agents in the group derived from the location-based information and display the location-based information in concert with a location of the particular mobile user agent, wherein the location-based information is at least one of map information, navigation information, traffic information, promotional information, point of interest information, advertisement information, and GPS assistance information.

18. The system of claim 17, wherein:

the group is a broadcast/multicast group;

the group is further identified based on agent information for each of the mobile user agents in the group indicates that the respective mobile user agent is capable of receiving and processing the location-based information; and the communication module is further configured to broadcast or multicast the location-based information to the group.

19. The system of claim 17, wherein:

the identification module is further configured to:

identify a group location;

determine a location for each of the plurality of mobile user agents associated with the network; and determine that the mobile user agents in the group are within the group location based at least in part on the location of each of the mobile user agents in the group; and the location-based information is associated with the group location.

20. The system of claim 18, wherein:

the identification module is further configured to:

identify the mobile agents in the group as being within a geographic area; and determine an estimated group location within the geographic area for the group, the estimated group location based at least in part on the agent information for each of the mobile user agents in the group; and the location-based information is associated with the estimated group location.

21. The system of claim 18, wherein the agent information for each of the mobile user agents in the group further comprises device or network capabilities of the respective mobile user agent.

22. The system of claim 17, wherein the location information for each of the mobile user agents in the group comprises the location of the respective mobile user agent determined by the respective mobile user agent using GPS information or GPS assistance information.

23. The system of claim 18, wherein the agent information indicates that at least one of the mobile user agents in the group previously requested GPS assistance information.

24. The system of claim 17, wherein the communication module is further configured to provide the location-based information without first receiving a user request for the location-based information from any of the mobile user agents in the group.

25. The system of claim 17, wherein the determination module is further configured to request the location-based information from a location-based information provider.

* * * * *